United States Patent [19]

Olsson

[11] 4,430,052
[45] Feb. 7, 1984

[54] BELLING MANDREL ASSEMBLY
[75] Inventor: Robert P. Olsson, Renton, Wash.
[73] Assignee: Western Plastics Corporation, Tacoma, Wash.
[21] Appl. No.: 397,533
[22] Filed: Jul. 12, 1982
[51] Int. Cl.³ ............................................. B29D 23/00
[52] U.S. Cl. ......................... 425/392; 425/DIG. 218
[58] Field of Search ...... 425/392, 393, 403, DIG. 218
[56] References Cited
U.S. PATENT DOCUMENTS
3,732,054 5/1973 Lyng .................................... 425/393

Primary Examiner—Thomas P. Pavelko
Attorney, Agent, or Firm—Eugene D. Farley

[57] ABSTRACT

A belling mandrel assembly for forming in the end of a plastic pipe a belled socket having therein an annular seal pocket. A lip mold for forming the lip of the socket and a base mold for forming the base of the socket are operable to press a plurality of form block segments trapped between them. Upon the application of such pressure, the form block segments expand to form an annular ring for molding an annular seal pocket in the socket. Upon widening the distance between the lip mold and the base mold the form block segments retract to allow the mandrel to be withdrawn from the belled socket.

15 Claims, 11 Drawing Figures

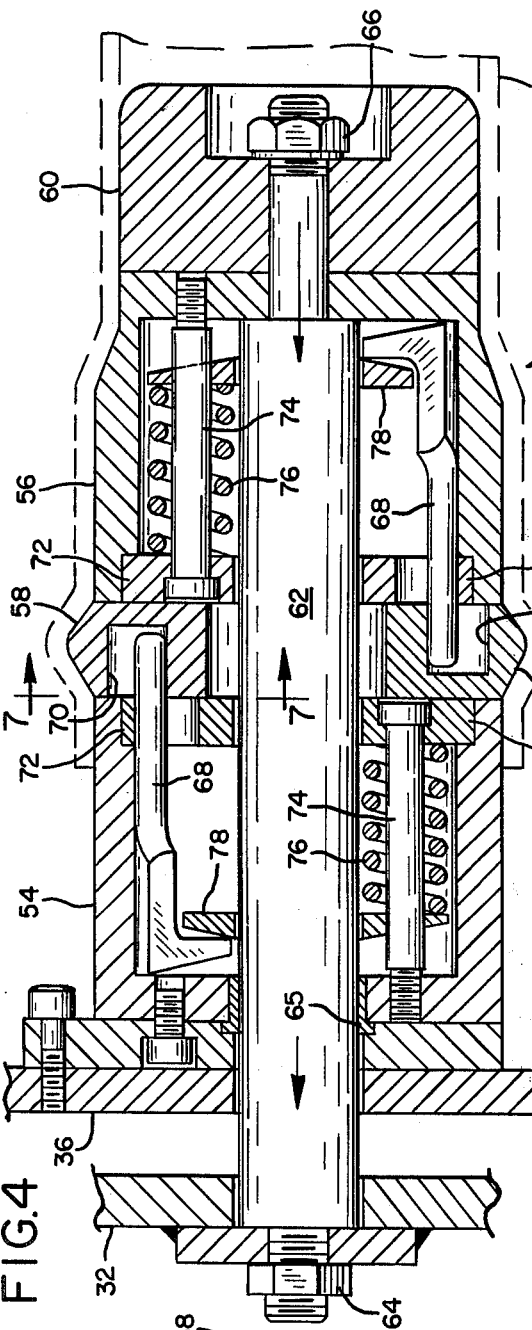
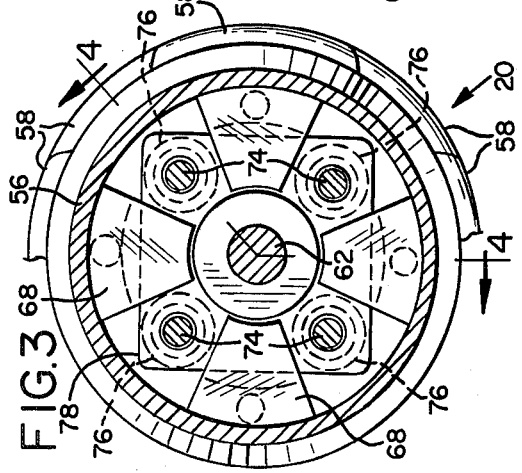
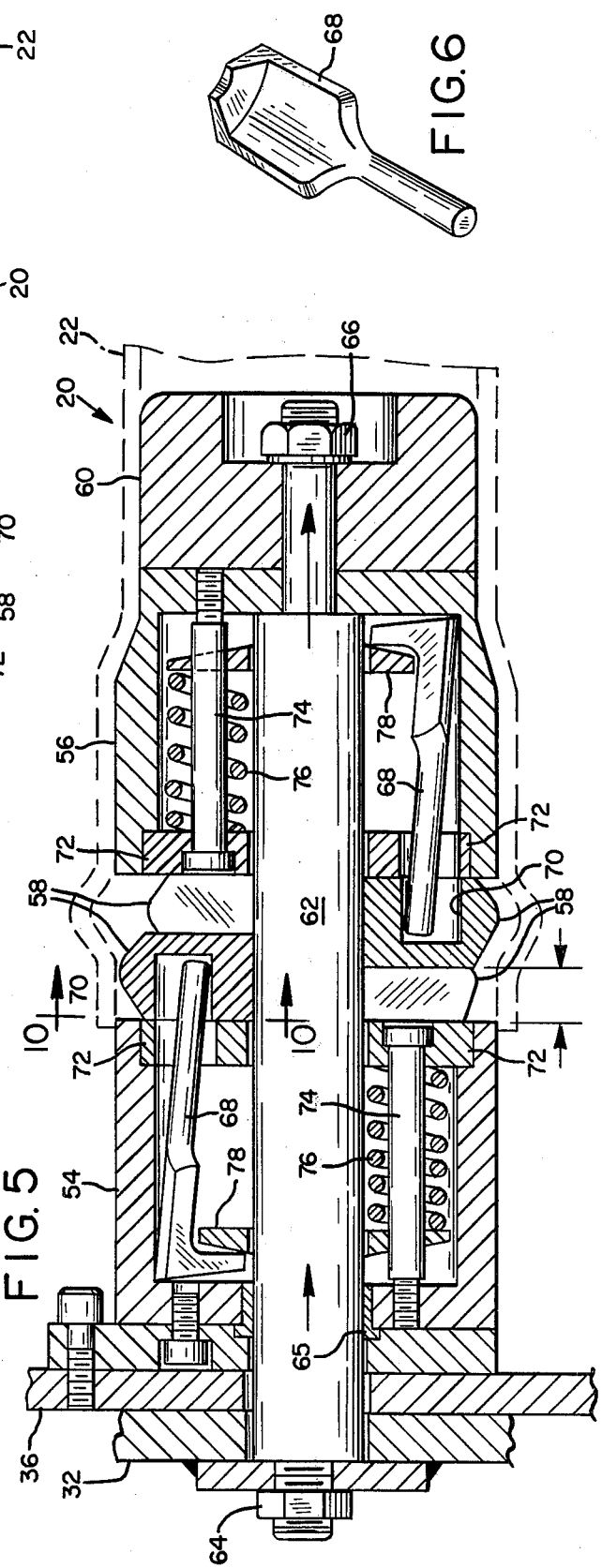
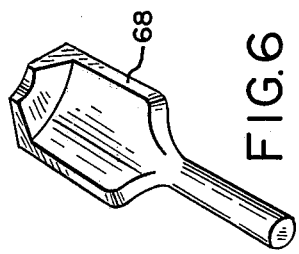

BELLING MANDREL ASSEMBLY

BACKGROUND OF THE INVENTION

This invention relates to plastic pipe forming apparatus, and more particularly to a mandrel for forming a belled socket in the end of a pipe, the socket being formed with an annular seal pocket.

A common method for joining pipe sections end to end is to provide on one end of each pipe section a socket sized to receive the straight end of the adjoining pipe section. To provide a fluid-tight fit, it also is common practice to locate a seal member between the two pipe sections.

This is done by providing an annular space or pocket within the belled, or socket, end into which a seal member may be placed. The seal member is located in such a manner that upon inserting the adjoining pipe section the seal member abuts both pipe sections and thus is secured in place.

In this manner it is also possible to allow a degree of freedom in the fit of the sections, so that the alignment of the joint need not be exact. Also the pipeline may expand or contract, without affecting the effectiveness of the seal.

The use of this type of joint is particularly common in plastic pipelines. Accordingly, a number of devices of the same general classification as that of the presently disclosed device have been employed to produce belled sockets on the end of plastic pipe sections.

Some of the prior art devices mold the exterior of the socket. Since the pipe wall is of a predetermined thickness, such a socket is formed on the inside of the pipe. However, this type of apparatus cannot be relied upon to produce a product of close tolerances because of differences in wall thickness and other factors. Accordingly, with this type of manufacture, the joints are prone to leak. Moreover, a separate mold is required for each different pipe wall thickness since the interior size of the socket must remain the same.

Other prior art devices have internal molding mandrels. The problem encountered with an internal molding mandrel is one of forming the annular seal pocket in the socket. The molding apparatus includes an annular ring, the seal-pocket-molding parts of which must be retracted into the mandrel before it can be withdrawn from the pipe; else the lip of the pipe will be destroyed upon separation of the pipe from the mandrel.

The apparatus for extending and retracting the segments of the mandrel forming the annular ring in the prior art devices is complex and malfunction-prone. Some such devices include pivoted segments which must be extended in a specified order. Others have segments which are collapsible upon rotation.

Accordingly, it is the general object of the present invention to provide a belling mandrel for enlarging and forming a belled socket on the end of a plastic pipe.

Another object is to provide a belling mandrel of simple construction, having moving parts which function repeatedly without malfunction.

A further object is to provide component parts which have very large bearing surface areas.

Yet another object is to provide a belling mandrel frame and drive assembly which is simple and rugged in construction.

A still further object is to provide a belling mandrel which is accurate, simple, rugged and the design for which may be scaled up or down for use in a wide range of pipe sizes.

These and other objects and advantages of the present invention, and the manner in which they are achieved will be made apparent in the following specification and claims.

SUMMARY OF THE INVENTION

In its basic concept, the present invention comprises a belling mandrel assembly for enlarging the end of a plastic pipe and forming a belled socket having therein an annular seal pocket. The mandrel includes a base mold for molding the base of the socket and a lip mold for molding the lip of the socket.

A plurality of retractable form block segments also are provided. These form an annular ring for molding an annular seal pocket in the socket. Shifting means are provided for extending the retractable form block segments, and retracting means are provided for retracting them.

BRIEF DESCRIPTION OF THE DRAWING

FIG. 3 is a transverse section of the belling mandrel, taken along the line 3—3 of FIG. 2.

FIG. 4 is a section taken along the line 4—4 of FIG. 3.

FIG. 5 is a section similar to FIG. 4, illustrating the mandrel in the position also shown in FIG. 1, the pipe having been formed over the mandrel.

FIG. 6 is a top perspective view of a right-angle lever, a component part within the mandrel.

DESCRIPTION OF THE PREFERRED EMBODIMENT

Figure 1:
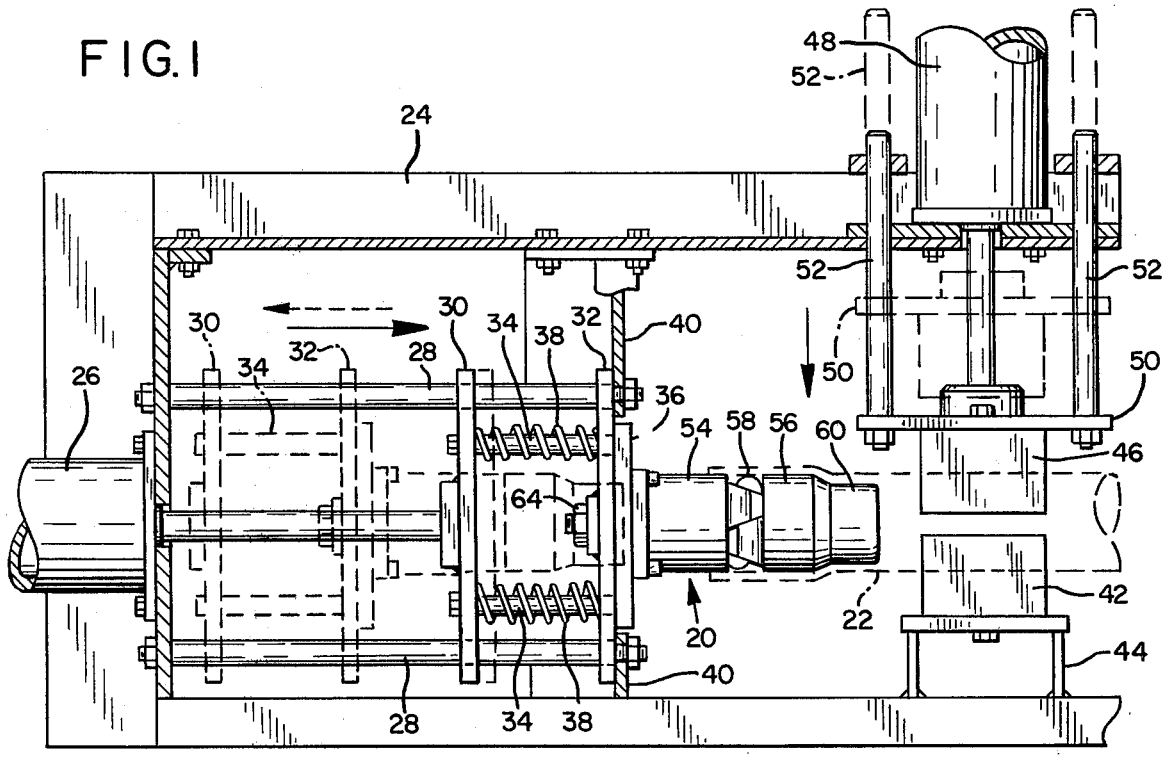
FIG. 1 is a side elevation of the belling mandrel assembly of the present invention illustrating the mandrel, in solid lines, in a partially extended position, and in phantom lines in a retracted position.
Figure 2:
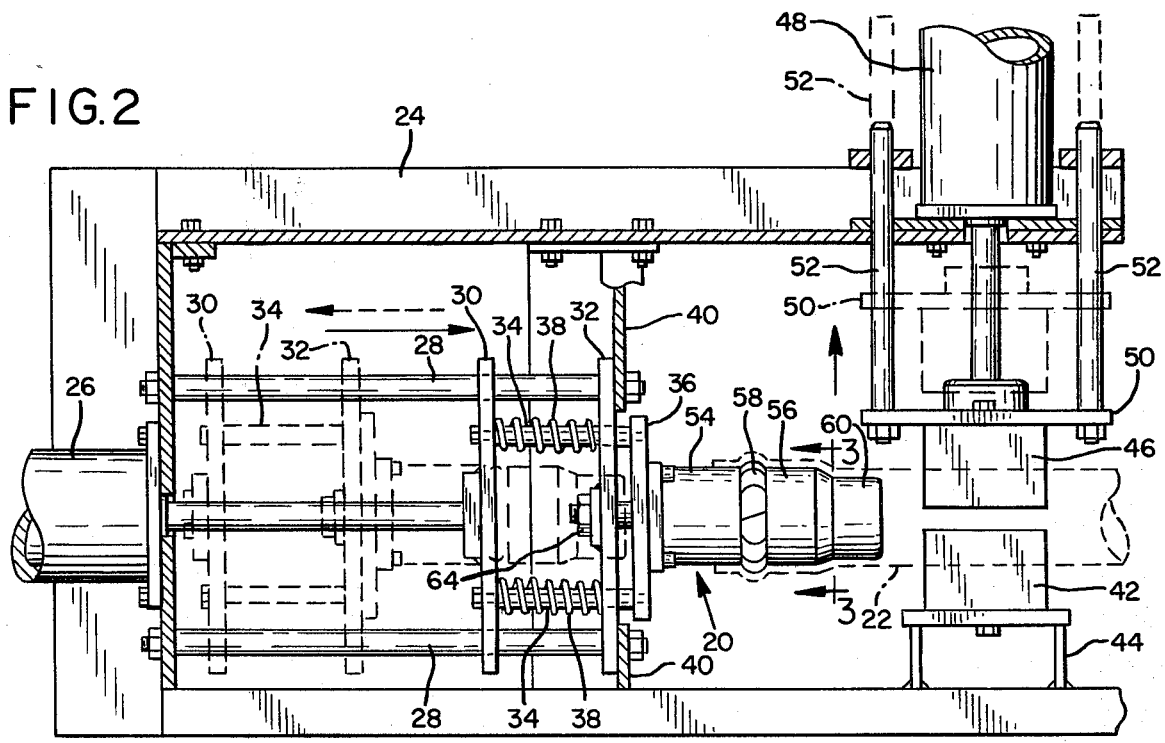
FIG. 2 is a side elevation similar to FIG. 1 illustrating the mandrel in a further extended position.
Figure 7:
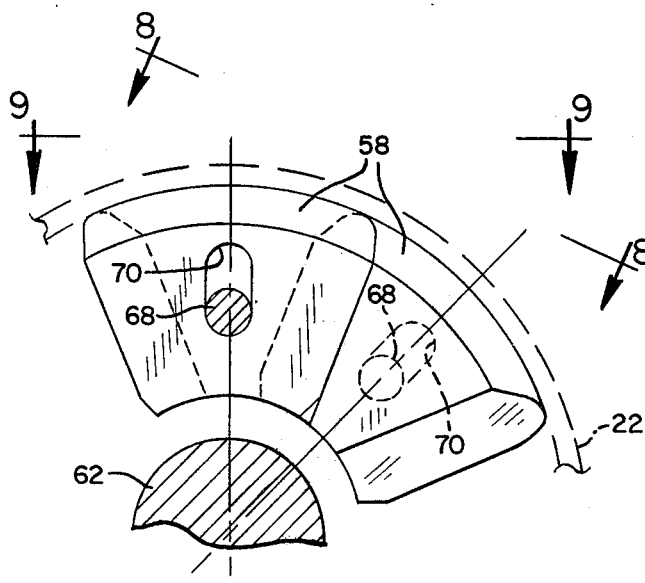
FIG. 7 is a section taken along the line 7—7 of FIG. 4 illustrating a pair of form block segments, which are the seal pocket forming components of the mandrel, in their extended position.
Figure 10:
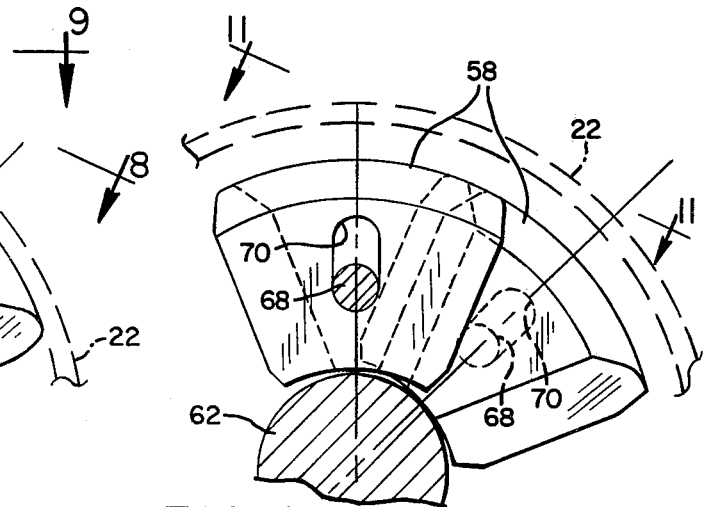
FIG. 10 is a section taken along the line 10—10 of FIG. 5 illustrating a pair of form block segments in their retracted position.

In its preferred embodiment the belling mandrel assembly of the present invention is illustrated generally in FIGS. 1 and 2.

A mandrel, indicated generally at 20, is shown engaging the end of a plastic pipe 22 with the object in view of forming a belled socket therein. The retracted position of the mandrel is shown in phantom line.

A frame including a stationary support 24 mounts drive means for reciprocating the mandrel. The drive means includes a fluid operated cylinder, preferably hydraulic cylinder 26 mounted on the support.

A plurality of longitudinal rods 28 are attached to support 24 and form a track.

A carriage, mounting mandrel 20, is mounted on the track to slide longitudinally, in line with the axis of hydraulic cylinder 26. The carriage includes two spaced apart plates 30 and 32 which have holes therein slidably receiving track rods 28.

Longitudinal spacer rods 34 are attached to plate 30 and extend forwardly through holes in plate 32. They are attached to a mounting plate 36. Springs 38 on each of the spacer rods bias plates 30 and 32 apart. However, mounting plate 36 abuts forward plate 32 and thus keeps the springs in compression even at the widest spacing of plates 30 and 32.

The shaft of reciprocating drive cylinder 26 is connected to rearward plate 30, thereby providing drive means for reciprocating the carriage along the track.

Carriage stop means is provided on the track, in the form of stop plates 40, which also mount the ends of rods 28. Forward plate 32 abuts these stops when the carriage is in its forward position.

Cylinder 26 drives the carriage until forward plate 32 contacts the stops, (FIG. 1) and then drives the remainder of the carriage, including rearward plate 30, spacer rods 34, and mounting plate 36, forward still more (FIG. 2). This compresses springs 38 and produces a gap between forward plate 32 and mounting plate 36.

A pipe clamping means is provided for holding pipe 22 in a position to be engaged by mandrel 20. The pipe clamping means comprises a bottom jaw 42 mounted by a bracket 44, and a top jaw 46 which is supported by and movable with a reciprocating cylinder 48. To insure proper alignment, a bracket 50 attached to the top jaw mounts guide rods 52 which extend through holes in the frame.

Now considering more specifically the construction and manner of operation of mandrel 20, reference is made to FIGS. 3, 4 and 5.

The mandrel comprises a socket molding means including a lip mold 54, which is attached to mounting plate 36, a base mold 56 mounted coaxially with the lip mold, and a plurality of form block segments 58 mounted between the lip mold and the base mold.

The lip mold 54 is preferably of cylindrical configuration, its outside surface diameter being larger than the inside diameter of the pipe 22 to be molded. It is configured and dimensioned for coaxial engagement with the pipe to enlarge and mold the lip, or end portion, thereof. The lip mold is bolted to the mounting plate in a manner well known to those skilled in the art. It is hollow, and contains a portion of the seal pocket-forming mechanism to be hereinafter discussed. Its free end includes a bearing surface, against which other parts of the mechanism slide.

The base mold 56 is mounted coaxially with the lip mold for coaxial engagement with the pipe. Its outer surface is configured and dimensioned to enlarge and mold the base of the pipe socket.

The forward end of base mold 56 is tapered to facilitate engagement with pipe 22. A pilot 60, attached to the base mold, starts the mandrel into the pipe. Similarly to the lip mold, the base mold is hollow to contain parts of the working assembly. Also, the end surface, facing the lip mold, forms a bearing surface similar to that formed by the opposing end of the lip mold.

A plurality of form block segments 58 are mounted between the lip mold and the base mold. These form the seal pocket in the pipe socket. Each form block segment is a section of an annular ring, composed of an assembly of similar segments.

Figure 8:
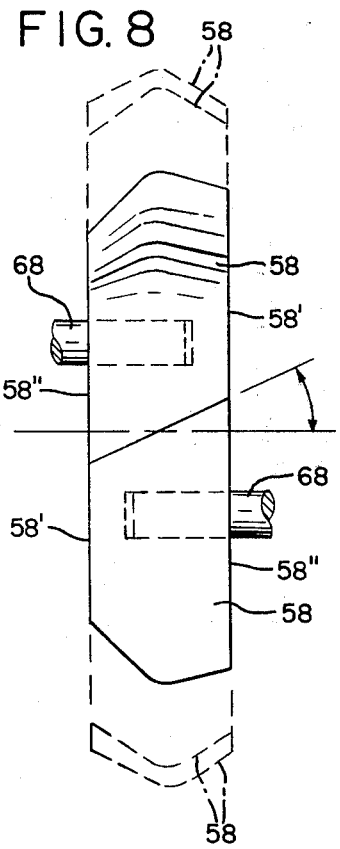
FIG. 8 is an oblique view of the form block segments, looking in the direction of line 8—8 of FIG. 7.
Figure 9:
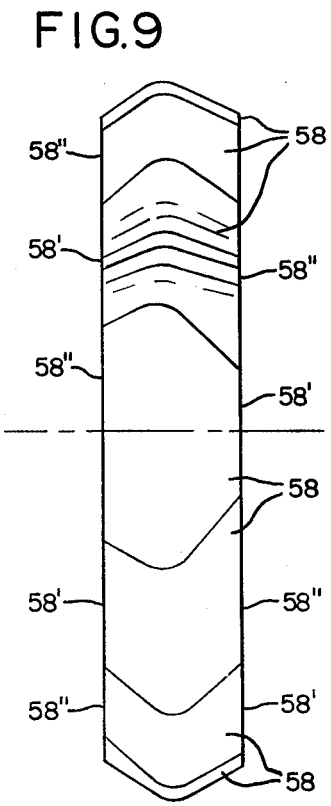
FIG. 9 is a plan view of the form block segments, looking in the direction of line 9—9 of FIG. 7.
Figure 11:
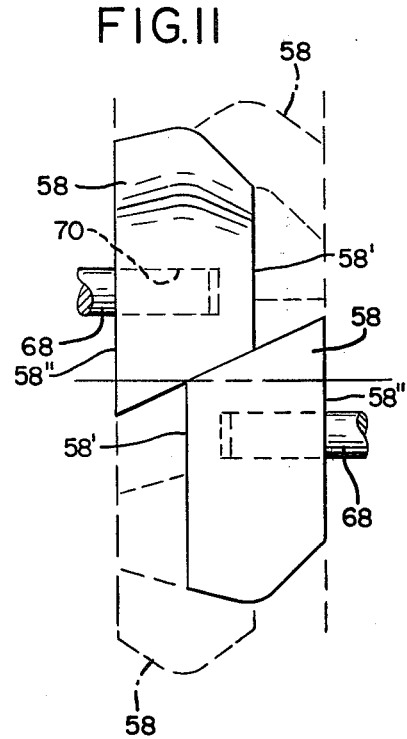
FIG. 11 is an oblique view of the form block segments looking in the direction of line 11—11 of FIG. 10.

Each of the form block segments has radial sides. However, as best illustrated in FIG. 8, the sides are angled with respect to the longitudinal axis of the mandrel. The sides of each segment are angled oppositely. Thus, as best shown in FIG. 9, each segment has a short face 58' and an opposing long face 58" forming a compound wedge-shaped section. The segments, each being similar in configuration, are alternated to form the annular ring.

The assembly and mode of operation of form block segments 58 are illustrated in FIGS. 7-11.

The form block segments bear against each other along their radial edges. Their long faces 58" bear against the end surfaces of lip mold 54 and base mold 56. They are configured and dimensioned to move radially outwardly from a first position to a second position when pressed between the lip mold and the base mold.

In the first or retracted position, shown in FIGS. 1, 5, 10 and 11, the segments are recessed within the area defined by a geometrical extension of the outer surface of the lip mold. Thus pipe 22 can be placed over, or removed from, the mandrel without obstruction by the form block segments.

Figures 2-4 and 7-9 illustrate the second or expanded position of form block segments 58. In these views the form block segments are expanded to form a continuous, annular ring having an outside surface forming a bead of a diameter larger than either lip mold 54 or base mold 56, in order to mold a seal pocket in the socket of pipe 22.

The top or outer surfaces of the form block segments have the form of the desired configuration of the seal pocket, which they determine. Preferably, the surface is curved smoothly and is continuous with the outside surface of the lip mold and the base mold.

Since the radial sides of form block segments 58 are angled, and they are alternated in orientation, pressing the form block segments between lip mold 54 and base mold 56 causes them to expand to form the annular ring of their second or expanded position. Conversely, increasing the distance between the lip mold and the base mold allows the form block segments to retract to their first or retracted position.

Shifting means is provided in the form of shift rod 62. The shift rod is mounted on the frame, secured to forward plate 32 by a nut 64. It passes freely through mounting plate 36 and through a bushing 65 in lip mold 54, and mounts base mold 56. Pilot 60 is also secured to the base mold and the shift rod by a nut 66.

Shift rod 62 is operable to reciprocate the base mold axially, relative to the lip mold, to vary the distance between the lip mold and the base mold. When the shift rod is moved relatively to the left, from the position of FIG. 5 to the position of FIG. 4, form block segments 58 are pressed between the lip mold and the base mold and move radially outwardly from their first position to their second position.

The hollow inside of lip mold 54 and base mold 56 houses retracting means for retracting form block segments 58 from the second position to the first position. When hydraulic cylinder 26 is activated to retract the mandrel, the first action decreases the gap between forward plate 32 and mounting plate 36. Through the action of shift rod 62, this increases the distance between the lip mold and the base mold. The form block segments are no longer pressured outwardly, and accordingly retract.

The retracting means includes right-angle levers 68 (FIG. 6) one associated with each form block segment 58. As shown in FIG. 4, the levers engage a hole 70 in each form block segment and restrict further outward movement of the segment. Each lever is operable to pivot at its angle to pull the associated form block segment inwardly. The outside end of the lever is beveled to accommodate this angular movement, as shown in FIG. 5.

A spring base 72 is mounted in the inside ends of lip mold 54 and base mold 56 by bolts 74. The spring base provides additional bearing surface on the ends of the lip mold and base mold.

A spring 76 around each bolt abuts the spring base. The other end of the spring abuts a spring plate 78 which is mounted slidably within the socket molding means. Spring plate 78 abuts not only the spring, but also right-angle levers 68. As the springs are kept in compression, this continuously biases form block segments 58 inwardly.

As shown in FIG. 3 there are preferably eight form block segments 58. Accordingly, four right angle levers 68 and four springs 76 are mounted within each end of the socket molding means. The springs are out of alignment one-eighth of a rotation from the levers. The biasing force of the springs is transferred to the levers through the spring plate.

OPERATION

A length of pipe 22 is moved into position for engagement by mandrel 20 and is secured by jaws 42 and 46. Its end is preheated to allow the mandrel to engage and expand it to form the belled socket.

Hydraulic cylinder 26 drives the carriage mounting mandrel 20 into engagement with the pipe. Pilot 60 assures alignment and the plastic pipe enlarges as it flows around the taper in the outer surface of base mold 56.

Forward plate 32 contacts stop 40, which also stops the forward travel of base mold 56. Springs 38 and springs 76 are compressed as lip mold 54 continues to move forwardly. As the distance between the lip mold and the base mold decreases form block segments 58 are pressed outwardly.

As lip mold 54 reaches its limit of travel form block segments 58 are fully extended to form the annular seal pocket. In this position pipe 22 is allowed to cool.

When the pipe is cool hydraulic cylinder 26 begins to retract mandrel 20. As a first action the gap between forward plate 32 and mounting plate 36 closes. This widens the space between lip mold 54 and base mold 56 and allows form block segments 58 to be retracted. The retracted position of the form block segments is within the cross sectional area of the lip of the pipe. Thus, the entire mandrel may then be removed from the newly formed belled socket.

Having described my invention in its preferred embodiments, I claim:

1. A belling mandrel assembly for enlarging the end of a softened plastic pipe, comprising:
   (a) a frame,
   (b) mounted on the frame, socket molding means comprising:
      (1) lip mold forming means
      (2) base mold forming means engaged coaxially with the lip mold means
      (3) seal pocket forming means interposed between the lip mold forming means and base mold forming means,
      (4) shifting means engaging the seal pocket forming means for shifting it radially from retracted position to advanced position, and
      (5) retracting means engaging the seal pocket forming means for moving it radially from advanced position to retracted position.

2. The belling mandrel of claim 1 wherein the shifting means includes drive means interengaging the frame and one of the lip end base molds for moving the molds relatively toward each other to effect movement of the seal pocket forming means toward advanced position.

3. The belling mandrel of claim 2 wherein the retracting means is operable upon movement of the molds relatively away from each other to move the seal pocket forming means toward retracted position.

4. The belling mandrel of claim 2 wherein the seal pocket forming means comprises a plurality of form block segments each comprising a section of an annular ring and having radial sides angled with respect to the longitudinal axis forming a compound wedge shape, the plurality of formed blocked segments being arranged for sliding engagement with the confronting ends of the lip and base molds, whereby movement of the molds relatively toward each other effects movement of the form block segments toward advanced position.

5. The belling mandrel of claim 4 wherein the retracting means interengages the form block segments and at least one of the molds and is operable upon movement of the molds relatively away from each other to move the form block segments toward retracted position.

6. A belling mandrel assembly for enlarging the end of a plastic pipe and forming a belled socket with an annular seal pocket therein, the assembly comprising:
   (a) a frame;
   (b) mounted on the frame, socket molding means comprising:
      (1) a lip mold attached to the frame and having an outer surface configured and dimensioned for coaxial engagement with the pipe to enlarge and mold the lip thereof,
      (2) a base mold mounted coaxially with the lip mold for coaxial engagement with the pipe and having an outer surface configured and dimensioned to enlarge and mold the base of a socket therein, and
      (3) a plurality of form block segments mounted between the lip mold and the base mold and slidably engaging the end surfaces thereof, the form block segments being configured and dimensioned to move radially outwardly from a first position to a second position when pressed between the lip mold and the base mold, the form block segments being recessed within the area defined by a geometrical extension of the outer surface of the lip mold when in the first position, and forming a continuous annular bead configured to mold an annular seal pocket in the socket of the pipe when in the second position;
   (c) shifting means mounted on the frame and extending through the lip mold and mounting the base mold, the shifting means being operable to reciprocate the base mold axially, relative to the lip mold, to vary the distance between the lip mold and the base mold, thus being operable, upon decreasing the distance between the lip mold and the base mold, to press the form block segments between the lip mold and the base mold causing the form block segments to move radially outwardly from the first position to the second position; and (d) retracting means engaging the form block segments for retracting the form block segments from the second position to the first position when the distance between the lip mold and the base mold is increased by operation of the shifting means.

7. The belling mandrel assembly of claim 6 wherein the frame comprises a stationary support, pipe clamping means mounted on the support for holding the pipe to be molded in a position for engagement by the socket molding means, and drive means for advancing the socket molding means into engagement with the pipe.

8. The belling mandrel assembly of claim 7 wherein the drive means is attached to both the lip mold, and base mold via the shifting means, and further comprising stop means for stopping the advancement of the base mold while continuing advancement of the lip mold thereby varying the relative distance between the lip mold and the base mold.

9. The belling mandrel assembly of claim 6 wherein the lip mold and the base mold are of similar outer configuration and dimension.

10. The belling mandrel assembly of claim 6 further comprising pilot means attached to the base mold and being substantially of the cylindrical dimension of the pipe, for piloting the belling mandrel into the pipe.

11. The belling mandrel assembly of claim 6 wherein each of the form block segments comprises a section of an annular ring, each of the segments having radial sides angled with respect to the longitudinal axis forming a compound wedge-shaped section.

12. The belling mandrel assembly of claim 6 wherein each of the form block segments is configured and dimensioned substantially similarly.

13. The belling mandrel assembly of claim 6 wherein each of the form block segments has a substantially smooth arcuate outside surface, the curve of the surface being continuous with the outside surface of the lip mold and the base mold when the form block segments are in their second position.

14. The belling mandrel assembly of claim 6 wherein the retracting means comprises a plurality of right-angle levers each engaging one of the form block segments, the lever pivoting against a bearing surface inside the socket molding means, and a spring biasing the lever to move the form block segment toward its retracted, first position.

15. The belling mandrel assembly of claim 14 further comprising a spring plate mounted slidably within the socket molding means and abutting the springs on its one side and the right-angle levers on its other side, the springs being out of alignment with the right-angle levers, the biasing force of the springs being transferred to the right-angle levers through the spring plate.

* * * * *